United States Patent Office 3,483,472
Patented Dec. 9, 1969

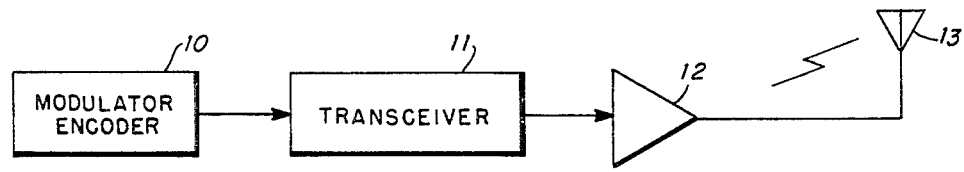
FIG. 1
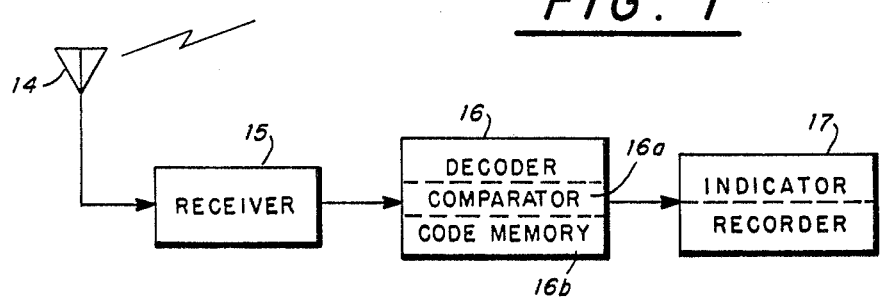
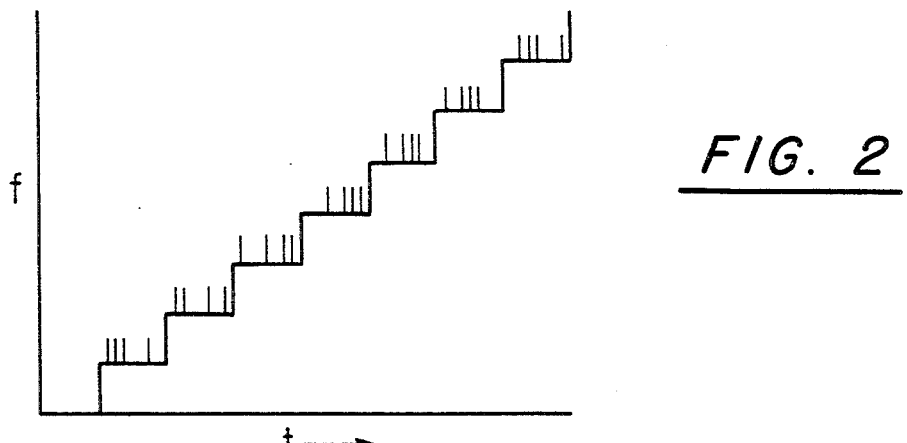
FIG. 2
FIG. 3
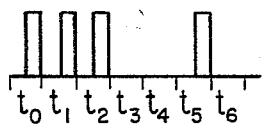
FIG. 4
INVENTORS
LESTER J. KINKEL
ROBERT P. McMANUS
ATTORNEYS

3,483,472
PULSE CODE MODULATED SOUNDER SYSTEM
Lester J. Kinkel and Robert P. McManus, San Diego, Calif., assignors to the United States of America as represented by the Secretary of the Navy
Filed Dec. 30, 1965, Ser. No. 517,870
Int. Cl. H04b 7/02, 1/00, 7/00
U.S. Cl. 325—56                                        6 Claims

ABSTRACT OF THE DISCLOSURE

The sounder system comprises at least two stations capable of sending and receiving radiated signals on a plurality of different frequencies. At least one of the stations is capable of generating and radiating pulse signals on each of the different frequencies for testing the reception at the other station. The radiating station encodes the pulse signals for communicating intelligence at each of the plurally different frequencies in accordance with the efficiency of its reception at the receiving station, and means are provided in the receiving station for storing encoding information for decoding the intelligence contained within the received signals.

---

The present invention is related to a sounder system and more particularly is conceived to extend the capability of the conventional type of sounder system from a frequency determining system to include the transmission of intelligence information relating to the discrete frequencies which are being assessed for path and interference conditions.

STATEMENT OF GOVERNMENT INTEREST

The invention described herein may be manufactured and used by or for the Government of the United States of America for governmental purposes without the payment of any royalties thereon or therefor.

High frequency communication systems between remote stations utilizing the technique of oblique incidence ionospheric transmission may suffer from the deficiency that certain frequencies will not support communications between remote points at all times.

Particles in the earth's upper atmosphere become influenced by the intense radiation from the sun and are ionized in sufficient quantities to form discrete charged layers. Diurnal, solar and seasonal variations of the earth relative to the sun not only cause layer density and height differences of the layers, but during disturbed conditions can form new layers or cause excessive absorption of certain frequencies in the high frequency communications spectrum. Generally, long distance frequency communications are supported by layers commonly referred to as E, $F_1$, $F_2$ located at approximately 100, 200 and 300 kilometers above the earth's surface, respectively.

Dynamic changes within these layers effect transmission frequencies within the high frequency spectrum which are capable of supporting a satisfactory long distance communication path.

Conventional terminology has been developed to describe the frequency spectrum which will support a communication path transmission. For instance, "LUF" designates the lowest usable frequency within the high frequency communication spectrum that will reliably support a given path of communication between two remote points. Similarly, "MUF" is employed to designate the highest or maximum usable frequency within the high frequency communication spectrum which will support transmissions and communications between remote points. Since the ionospheric conditions are continuously and dynamically changing, techniques have been developed for testing the suitability of discrete frequencies within a chosen frequency spectrum for supporting communications on a long distance path between two remote stations. Such point-to-point path information may be developed by what has come to be known as a sounding system.

Conventionally, a sounding system may transmit test signals at discrete frequencies in a given predetermined sequence so as to test the feasibility of transmission on each of such discrete frequencies within a frequency spectrum. Customarily, in such systems the received sounding frequencies have been recorded on film record or on the face of a storage tube display. These displays use a calibrated frequency scale on the abscissa and a time delay on the ordinate axis to present a picture which is known as an ionogram. While such sounder systems are highly useful in establishing the feasibility of communications on a particular discrete frequency band or bands, they are conventionally not employed to transmit any intelligence or information.

The present invention conceives encoding pulse signals of a sounder system to communicate intelligence at each of a plurality of different frequencies transmitted by the sounder system so that the efficacy of the reception of the encoded signal is at one and the same time a test of the transmission capabilities and reliabilities of a particular frequency band as well as self-confirmation of certain types of encoded communications and instructions which may comprise the intelligence carried by the pulse signals.

For instance, the present invention conceives the transmission in a sounder system of an encoded pulse signal on each of a plurality of different frequencies which code may differ as desired from one frequency band to another and carry information as to prevailing conditions at the transmitting station and the desirability of attempting communications on that particular frequency band. Thus, within the concept of the present invention, the reliability with which such an encoded information signal is received is self-confirmatory of the desirability of communicating on that particular frequency band from the point view of the degree of path stability and signal fidelity of each such frequency band.

Accordingly, a primary object of the present invention is to provide an improved sounder system which is inherently more sensitive to attenuation, interference and other adverse effects encountered in transmission paths than known prior art systems.

Another basic object of the present invention is to provide an improved sounder system including the capability of communicating intelligence by test signals from a transmitting station to a receiving station on each of a plurality of frequencies within a predetermined frequency spectrum.

Another object of the present invention is to provide such a sounder system wherein the communicated intelligence is so related to the particular frequency at which it is communicated that its reception is self-confirmatory of the information communicated.

A still further object of the present invention is to provide such an improved sounder system for communicating intelligence wherein the information to be communicated is encoded.

Yet a further object of the present invention is to provide such an improved sounder system including a receiving station at a remote point which has means for storing encoding information which may be employed for verification of the communicated encoded intelligence.

These and other objects, features and advantages of the present invention will be more fully appreciated from the description of an embodiment of the present invention which follows together with the illustrative drawings and its scope will be pointed out more particularly in the appended claims.

In the drawings:

FIG. 1 is a schematic block diagram of a system embodying the present invention;

FIG. 2 is a graphical illustration of typical time versus frequency relationships of a sounder system transmitter operating in a sweep mode through a spectrum of frequencies;

FIG. 3 is a graphical illustration of pulse code modulation which may be employed within the concept of the present invention;

FIG. 4 is a tabular illustration of a type of polynomial sequences which may be employed to pulse encode intelligence information in the transmitted signal of a sounder system operating in accordance with the present invention.

Sounder systems of the prior art type which have conventionally been employed to test and assess conditions for supporting communications transmissions have generally been of three basic types. One such type of system is known as the "back-scatter" type, another is known as the "vertical incidence" type, and the third has come to be known as the "oblique incidence" type of sounder system.

The present invention is concerned with an oblique incidence type of sounder system which is employed to test a particular point-to-point path for suitable conditions for supporting communications transmission over that path. Such an oblique incidence communications system comprises at least two stations, usually remotely positioned from each other and at least one of the stations being capable of transmitting a signal with the at least one other station capable of receiving signals on the same frequencies as those transmitted by the sending station. Thus, a sounder system is employed to test and assess a spectrum of frequencies, the useability and the feasibility of communicating on those frequencies over a particular path between two or more remotely located stations.

FIG. 1 illustrates, by means of a schematic block diagram, the elements of a sounder system embodying the present invention. A transmitting station may comprise a modulator-encoder such as that illustrated and designated by the numeral 10 which provides the output to a transceiver of conventional design as represented at 11. The output of the transceiver 11 is amplified in a final amplifier 12 and then radiated from an appropriate antenna 13.

The receiving portion of the system receives the signal originally radiated from the transmitter antenna 13 at an appropriate antenna 14 which develops the signal input for a receiver 15. The output of the receiver 15 is fed as the input to a decoder 16 which may include code memory 16b. The output of the decoder 16 is then fed to an indicator recorder 17 whence it is recorded or displayed visually to indicate the feasibility of communications transmissions between the transmitter and the receiver over the particular path by means of oblique incidence ionospheric techniques.

In accordance with the concept of the present invention, the modulator-encoder 10 of the transmitter portion of the sounder system embodies the capability of modulating the transmitted signal with intelligence which it is desired to communicate to the receiving station. The modulator-encoder may be of the type disclosed and claimed in copending application Ser. No. 517,867 titled "Improved Modulation System" and filed Dec. 30, 1965 in the names of Lester J. Kinkel and Robert P. McManus, the co-applicants of the instant case. Such encoding is accomplished preferably at each of the discrete frequencies which may be transmitted by the transmission portion of the sounder system and usually will cover a spectrum of frequencies spanning the communications frequencies from the lowest to the maximum frequency which it is desired to employ for communications purposes.

The encoding at a plurality of discrete frequencies over a frequency spectrum may take the form illustrated by FIG. 2. In FIG. 2 frequency is shown versus time and as may be seen from the illustration, a pulse modulation code is developed at each of a plurality of discrete frequencies at different time intervals. It is not necessary to the present invention that the sounder system be pulse code modulated to communicate the desired intelligence from the transmitting to the receiving station. However, it has been found that a pulse code modulation of the type illustrated generally in FIG. 3, and preferably of related polynominal sequences is a desirable form of encoding the transmission signal. As illustrated in FIG. 3 uniform, sequential time periods $t0$ through $t6$ are encoded with pulses or the lack of pulses so as to transmit encoded information. Typically, such information may indicate the desirability of communicating on the particular discrete frequency over which such encoded information is transmitted. For example, the code illustrated in FIG. 3 in the form of pulse code modulation sequences, may indicate that there is a desirable signal-to-noise ratio condition prevailing at the transmission station at that frequency and therefore it is desirable to transmit on that particular frequency if such encoded intelligence transmission is received by the receiving station of the sounder system without undue interference, attenuation or other undesirable effects of uncontrollable conditions. A typical polynominal sequence which shows seven elements of code information contained within uniform, sequential time periods $t0$ through $t6$ is illustrated in FIG. 4. Such a polynominal sequence code, it will be observed, represents two distinguishing states in the form of a binary "1" or binary "0." These binary states may be represented by the presence of the lack of a pulse of the type illustrated in FIG. 3. It will be noted from the illustration of FIG. 4 that of the seven time elements which may be code modulation with pulse encoded information, four time elements are always of one distinguishable state and three time elements are always of the other distinguishable state. This lends a very desirable result in that it provides the maximum number of distinguishable state of one sequence of the series of plurality of related polynominal sequences with respect to each other sequence in the related plurality. When a signal of the type illustrated in FIGS. 2 and 3 is transmitted from the transmitting antenna 13 of the transmission of the sounder system, it is propagated over the path between the transmitting station and the receiving station and develops a commensurate signal at the receiving station antenna 14. From that point it is fed to a receiver 15 which provides the input to a decoder 16.

Such a decoder may have a memory means 16b for storing the same polynominal or other type of code sequences which it has been predetermined will indicate certain intelligence information on the sounder transmissions from the transmitting station to the receiver. With such stored codes it is possible to compare the code sequences in the code memory 16b with those received from the receiver in an appropriate comparator means 16a. If such comparison provides an identifiable codes, it is apparent that that particular frequency and the path between the transmitting statiton and the receiver station are both such that will support communications therebetween. If the code is not identifiable, it is conversely apparent that the particular frequency which was transmitted and received will not support communication between the two stations in a desirable manner.

An indicator 17, which may also include a recorder as illustrated in FIG. 1, is provided to indicate those frequencies which will adequately support communications between the stations. Such indicator desirably also has means of designating the coded intelligence information received at the receiver which may be desirable for communication purposes because of prevailing conditions such as a good signal-to-noise ratio at the transmitter or similar favorable conditions.

Thus, the present invention conceives a system which not only tests the feasibility and desirability of communicating at a frequency or plurality of frequencies in accordance with the prevailing instantaneous conditions existing over a path between two points at which remote stations are located, but it also provides a means of communicating intelligence information between those two points while testing the frequencies for their adequate support of communications therebetween.

Such information, when encoded and transmitted by the sounder system, if adequately received at the receiving station is self-confirmatory of the desirability of communicating at that particular frequency.

Conversely, if such encoded information is not recognizable because of attenuation, interference or other adverse effects, it is apparent that the concept of the present invention provides a "fail-safe" feature. As an example, the information which is encoded for transmission may indicate that because of favorable conditions at the transmitting station, it is desirable to communcate on that frequency; when such information is not communicated by reason of interference, attenuation or other adverse effects, the instructions can not be followed at the receiver station and are accordingly "fail-safe."

By the appropriate selection of intelligence information and meaningful relation to a plurality of pulse code modulated signals, for instance, the system can be made to be wholly self-confirmatory and fail-safe as described hereinbefore.

Additionally, the present invention is so conceived as to provide a code storage means for verification of received encoded information at the receiving station. When necessary and appropriate such stored code information can be employed for correction of received code information by comparison of the received encoded signal within the stored code sequences as conceived by the present invention.

A fundamental and inherent advantage of the present invention, as contrasted to prior art sounder systems, is that the transmission, reception and verification of encoded signals carrying intelligence information provides a significantly more exacting and meaningful test of transmission feasibility. As will be apparent to those skilled in the art, the intermittent attenuation or interference with a repetitive uncoded signal may be relatively difficult to detect in a conventional sounder system; the present invention is so conceived that like intermittent difficulties will result in some degree of lack of intelligibility of the encoded information and a consequent greater sensitivity to transmission path desirability.

Obviously many modifications and variations of the present invention are possible in the light of the above teachings.

What is claimed is:

1. A sounder system comprising;
    at least two stations capable of sending and receiving radiated signals on a plurality of different frequencies;
    means included in at least one of said stations for generating and radiating pulse signals on each of said different frequencies for testing the reception thereof at said other station;
    means at said radiating station for encoding said pulse signals whereby to communicate intelligence at each of said plurality of different frequencies in accordance with the efficiency of its reception at the receiving station; and
    means for storing encoding information at said receiving station.

2. A sounder system as claimed in claim 1 wherein said radiated signals are encoded by pulse code modulation.

3. A sounder system as claimed in claim 1 wherein said pulse code modulation is generated from a polynomial sequence.

4. A sounder system as claimed in claim 1 and including means for automatically stepping said radiated signals through said plurality of frequencies in a predetermined sequence.

5. A sounder system as claimed in claim 1 and including means for indicating reception of coded intelligence information at said receiving station.

6. A sounder system as claimed in claim 1 and including means for comparing received signals with said stored encoding information for verification of said communicated intelligence.

References Cited

UNITED STATES PATENTS 2,521,696  9/1950  De Armond _____ 325—51

ROBERT L. GRIFFIN, Primary Examiner

J. A. BRODSKY, Assistant Examiner

U.S. Cl. X.R.

325—39, 63, 65